No. 697,206. Patented Apr. 8, 1902.
H. L. HENDERSON.
CLUTCH.
(Application filed Aug. 31, 1901.)
(No Model.)
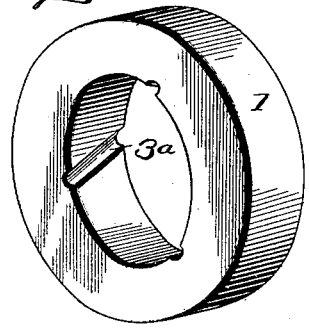
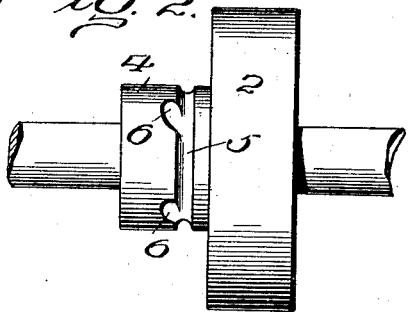
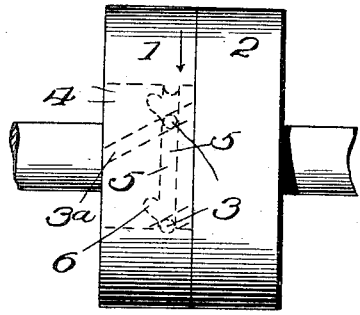
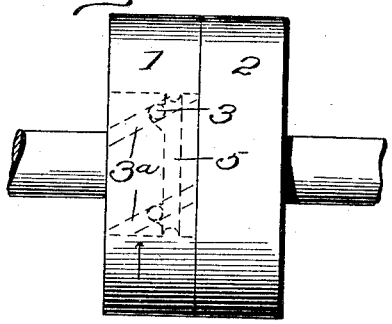
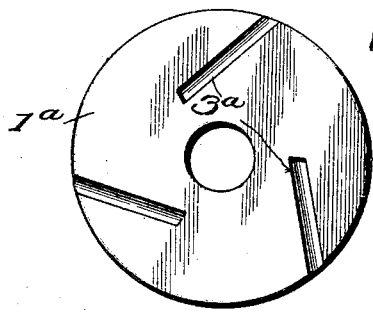
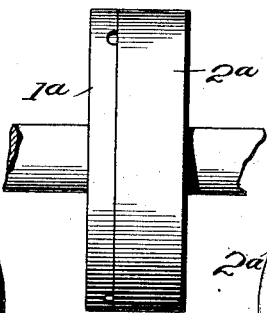
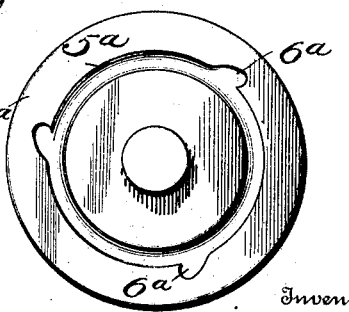
Witnesses
Inventor
Hermon L. Henderson.
Attorneys
THE NORRIS PETERS CO., PHOTO-LITHO., WASHINGTON, D. C.

UNITED STATES PATENT OFFICE.

HERMON L. HENDERSON, OF STEPHENS MILLS, NEW YORK.

CLUTCH.

SPECIFICATION forming part of Letters Patent No. 697,206, dated April 8, 1902.

Application filed August 31, 1901. Serial No. 74,008. (No model.)

*To all whom it may concern:*

Be it known that I, HERMON L. HENDERSON, a citizen of the United States, residing at Stephens Mills, in the county of Steuben and State of New York, have invented certain new and useful Improvements in Clutches; and I do hereby declare the following to be a full, clear, and exact description of the invention, such as will enable others skilled in the art to which it appertains to make and use the same.

This invention comprises clutch members and interposed balls, the latter acting in the dual capacity of ball-bearings and gripping elements to compel simultaneous rotation of the clutch members when the power-driven member is turned in the predetermined position for setting the clutch.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of the female member. Fig. 2 is an elevation of the male member. Fig. 3 is a detail view showing the position of the balls when the members are out of mesh. Fig. 4 is a view similar to Fig. 3, showing the position of the balls when the members are interlocked for simultaneous rotation. Fig. 5 is a modification. Figs. 6 and 7 are detail views of the members entering into the formation of the clutch shown in Fig. 5.

Corresponding and like parts are referred to in the following description and indicated in all the views of the drawings by the same reference characters.

The clutch comprises two members 1 and 2 and interposed balls 3. The part 1 (designated as the "female" member) is provided upon its inner circumference with inclined grooves $3^a$, and the part 2 (distinguished as the "male" member) is provided with a circular boss 4, having an annular groove 5 and intercommunicating notches 6. The boss 4 fits within the central opening of the member 1, and the balls 3 are arranged to extend about half-way into each of the grooves $3^a$ and 5. One of the members only is adapted to have the driving power applied thereto, the same being transmitted to the other member through the balls 3 in the manner presently to be stated. When the members of the clutch are arranged so that the female member 1 is rotated in the direction indicated by the arrow in Fig. 3, the balls 3 travel in the annular groove 5, and no motion is imparted to the member 2; but in the event of the member 1 being rotated in the direction indicated by the arrow in Fig. 4 the balls 3 are caused to enter the notches 6, and when they reach the end thereof the two members 1 and 2 become interlocked and rotate together in the same direction. A reversal of the movement of the member 1 returns the balls into the annular groove 5 and releases the clutch member 2 and unships the parts connected thereby.

In the form of clutch shown in Figs. 5, 6, and 7 the members $1^a$ and $2^a$ are disks or plates, the member $1^a$ having inclined grooves $3^a$ and the member $2^a$ having an annular groove $5^a$ and notches $6^a$ leading therefrom. The balls 3 fit in matching portions of the grooves and operate in the manner aforesaid. Within the scope of the invention it is immaterial whether the notches 6 or $6^a$ extend from the groove 5 either at a right angle or at any angle greater or less than a right angle, the latter arrangement being preferred, as the balls are better retained in the notches.

The clutch is especially adapted for propulsive mechanism of mechanically-propelled vehicles and the driving mechanism of agricultural machinery, although it is susceptible of general application where a clutch is required for use to effect a shipping and unshipping of rotating parts.

Having thus described the invention, what is claimed as new is—

1. In a clutch, coöperating members, one of the members having inclined grooves and the other member having an annular groove and notches extending therefrom, and balls fitted in the respective grooves and constituting antifriction and gripping elements, substantially as set forth.

2. In a clutch, coöperating members, one of the members having inclined grooves and the other member having an annular groove and inclined notches extending from the said groove, and balls fitted in said grooves and constituting gripping elements, substantially as set forth.

3. In a clutch, coöperating male and female members, the female member having inclined grooves in its inner wall and the male member having an annular groove in its projecting portion and notches extending from the said groove, and balls fitted in the said grooves and adapted to effect an interlocking between the members and cause simultaneous rotation thereof in the same direction, substantially as set forth.

In testimony whereof I affix my signature in presence of two witnesses.

HERMON L. HENDERSON.

Witnesses:
CHARLES W. STEVENS,
J. E. B. SANTEE.